United States Patent [19]

Kalua

[11] Patent Number: 4,866,530
[45] Date of Patent: Sep. 12, 1989

[54] MULTIPLE SCREEN, MODULAR VIDEO DISPLAY PROJECTION SYSTEM

[76] Inventor: Kevin A. Kalua, 750 Bell Canyon Rd., Angwin, Calif. 94508

[21] Appl. No.: 158,713

[22] Filed: Feb. 22, 1988

[51] Int. Cl.$^4$ .......................... H04N 5/68; H04N 9/18
[52] U.S. Cl. ...................................... 358/237; 358/65; 340/716
[58] Field of Search ................. 358/237, 231, 254, 64, 358/60; 340/716, 717

[56] References Cited

U.S. PATENT DOCUMENTS

| | | | |
|---|---|---|---|
| 3,450,454 | 6/1969 | Anders | 358/254 |
| 4,635,105 | 1/1987 | Favreau | 358/64 |
| 4,734,779 | 3/1988 | Levis | 358/64 |

FOREIGN PATENT DOCUMENTS

| | | | |
|---|---|---|---|
| 136188 | 8/1983 | Japan | 358/64 |
| 74891 | 4/1985 | Japan | 358/60 |

*Primary Examiner*—Tommy P. Chin
*Attorney, Agent, or Firm*—Harris Zimmerman; Howard Cohen

[57] ABSTRACT

A multiple screen, modular video display system includes a plurality of video projection units joined together in a matrix to form a large video wall display. Each unit comprises a trio of CRT projection tubes providing RGB images directed to a screen assembly including a fresnel lens which collimates and projects the combined image orthogonally from the screen and eliminates the dark border areas between adjacent projection tubes. Disposed between the adjacent units are blinder panels which block leakage of light from one unit onto the image area of adjacent units, thus eliminating spillover of image portions in the matrix display. The projection units may be grouped in modules of four units each, connected by a common frame assembly which supports the units and the associated screen assembly. The screen assembly may comprise a lamination of an inner transparent plastic panel extending across the entire module screen area, with the individual fresnel lenses joined to the inner plastic panel and a plurality of lenticular lenses secured to the outer surface of the screen assembly. Support wires may extend between medial points of the sides of the screen supports, the wires being received in grooves in the edges of the lenticular lenses to support the central portion of the screen assembly without any visible structure.

11 Claims, 5 Drawing Sheets

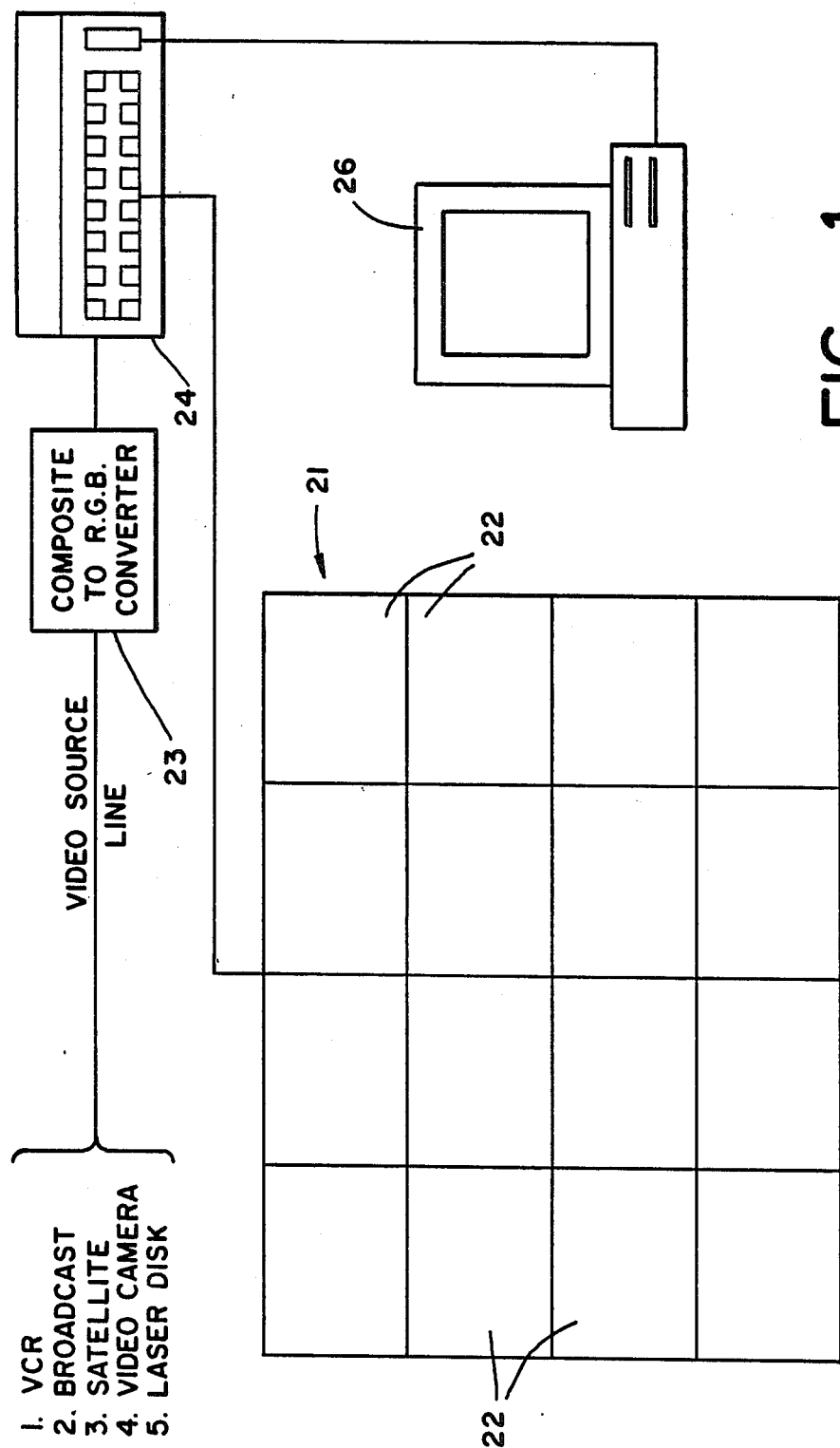

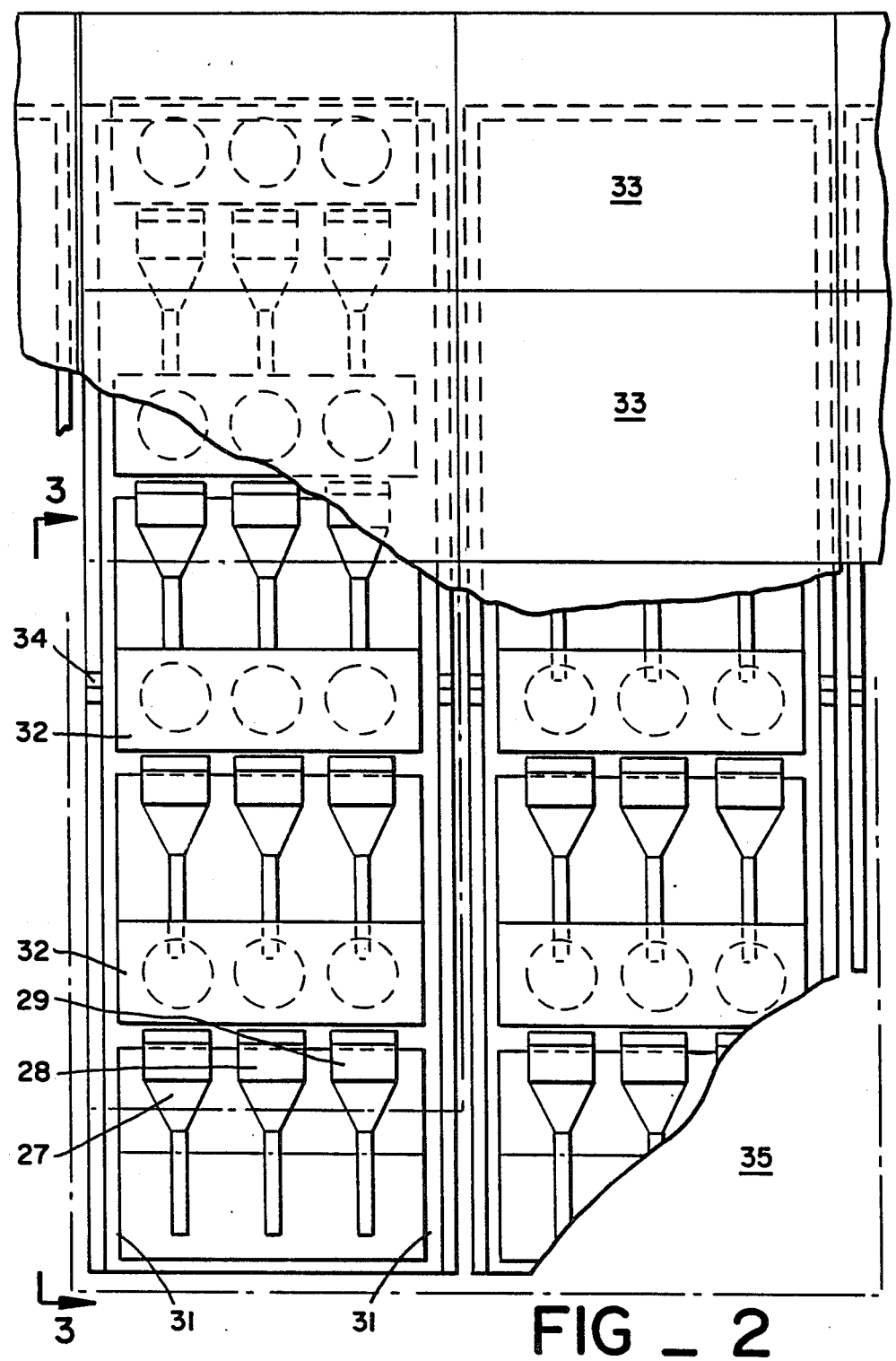
FIG _ 2

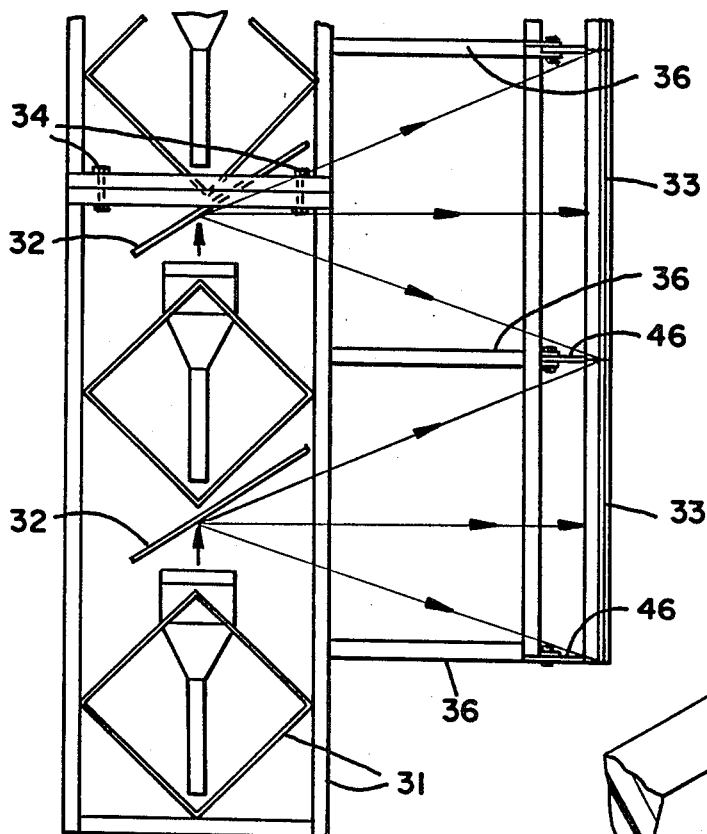
FIG _ 3
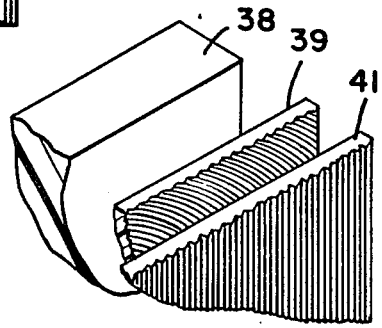
FIG _ 5
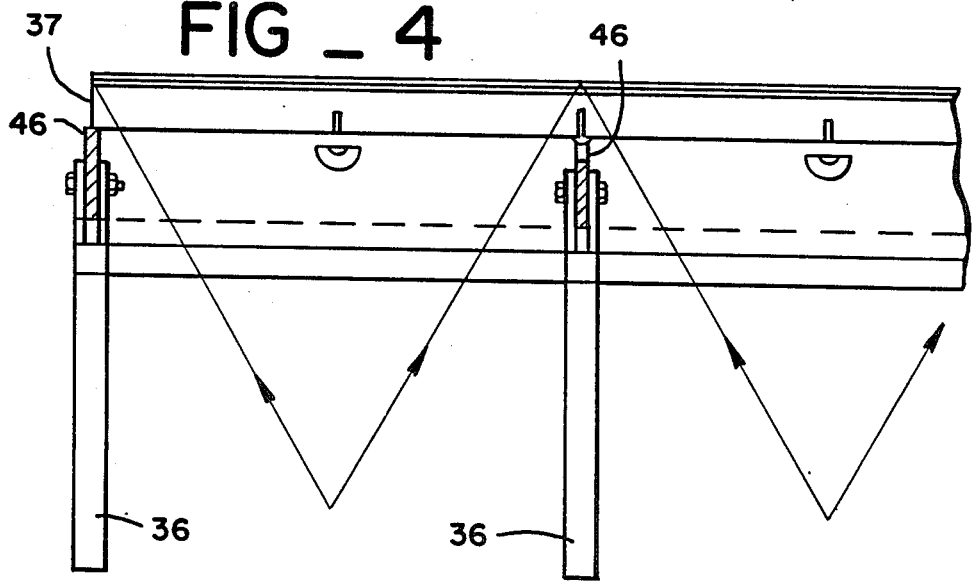
FIG _ 4

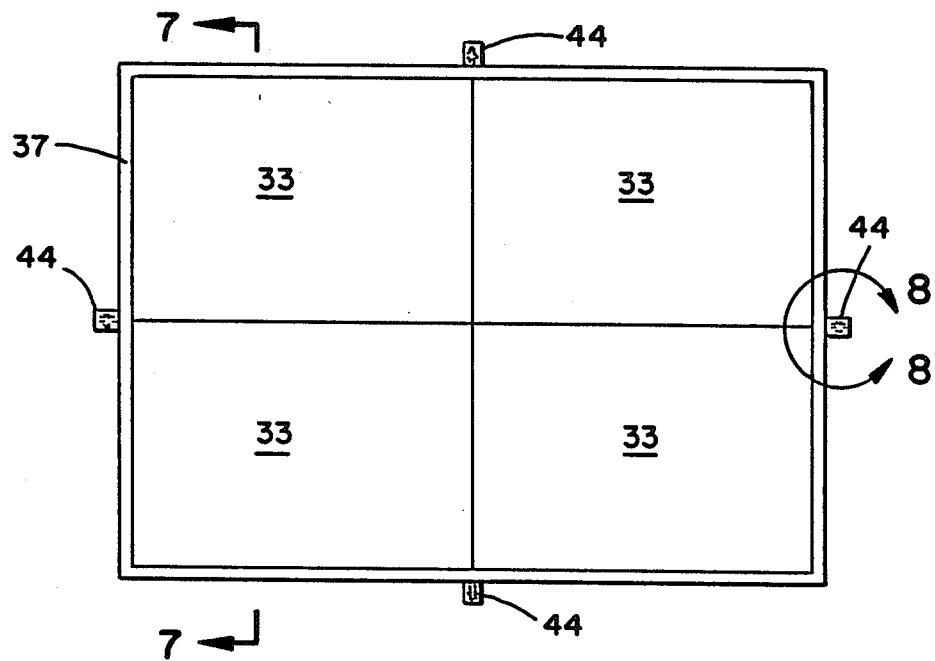
FIG_6
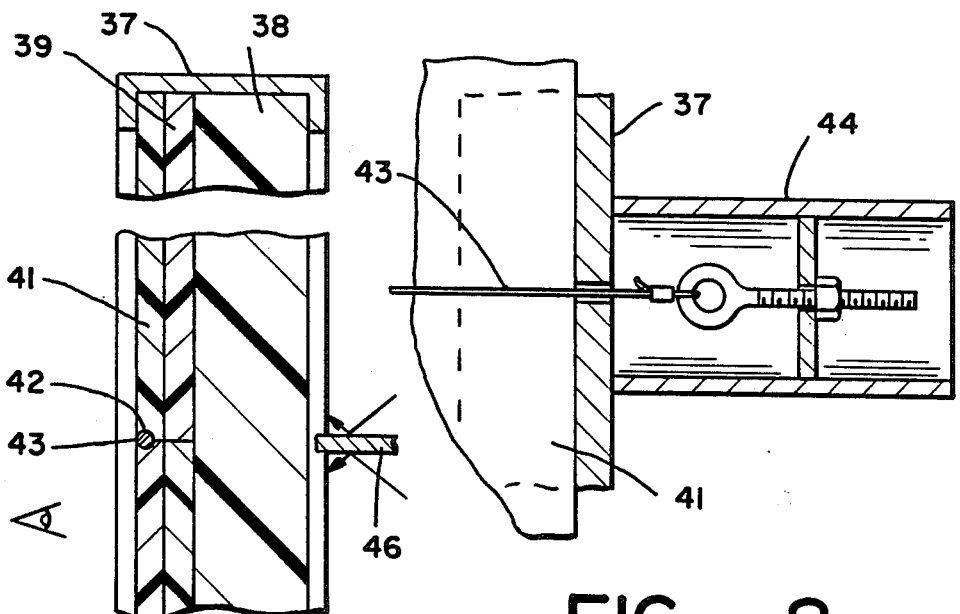
FIG_8
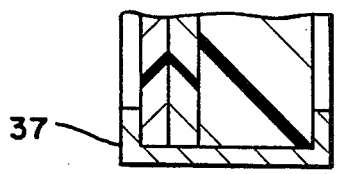
FIG_7

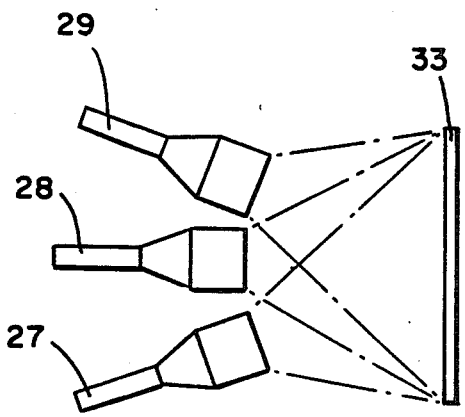
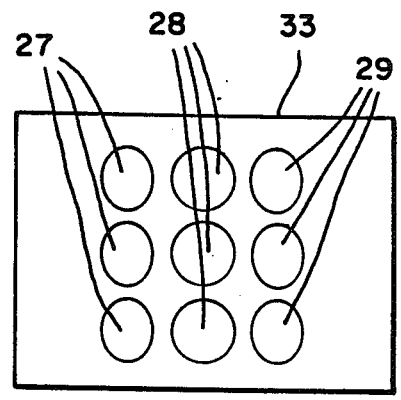
FIG _ 9  FIG _ 10
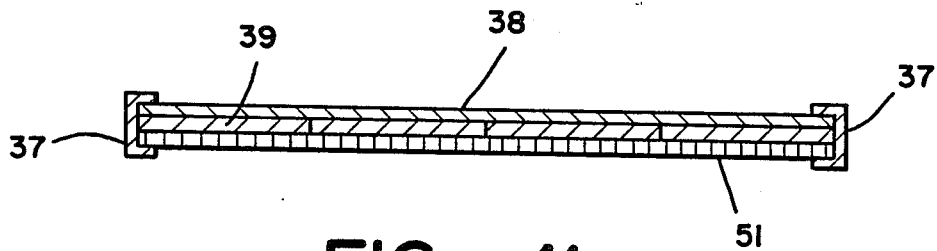
FIG _ 11
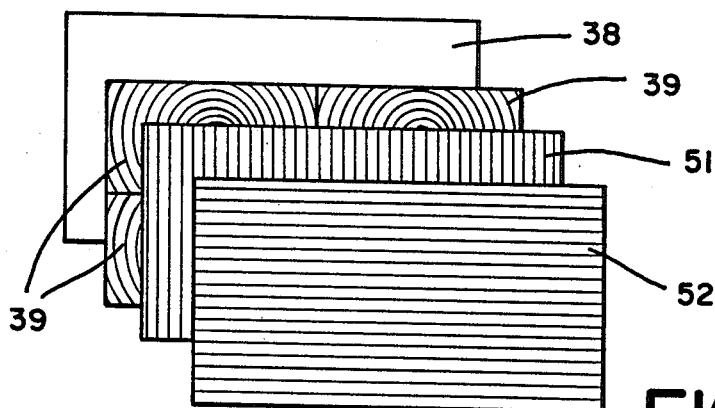
FIG _ 12

MULTIPLE SCREEN, MODULAR VIDEO DISPLAY PROJECTION SYSTEM

BACKGROUND OF THE INVENTION

The state of the art in video technology has been advanced in recent years with the introduction of large scale video displays based on television techniques. For example, the videowall concept, known for several years in the prior art, employs a large plurality of color cathode ray tubes disposed in a matrix, with image signals apportioned among the individual cathode ray tubes so that the entire matrix may display a single, large image, or various groups of tubes may display separate images, or the like. Such displays are extremely effective in creating moving image displays for entertainment and information purposes, and have found wide acceptance in convention halls, sports arenas, stadiums, and advertising display signs.

One drawback of the multiple television tube display is that the outer border of each tube cannot project any light, due to the physical limitations of the tube itself: the thickness of the glass tube wall, the difficulty of forming a truly rectangular tube screen, and the like. Due to these and other factors, the multiple television tube displays have always suffered from dark matrix lines between adjacent television tubes that detract from the impact and definition of the total image.

A remedy for this drawback, also known in the prior art, involves the use of a plurality of flat lenses, each disposed adjacent to one of the television tubes and adapted to magnify the image therefrom sufficiently to mask the dark edges of the tubes. Although this approach is effective, it invites the leakage or spillover of image light from adjacent television tubes, especially at viewing angles eccentric to the central portion of the display. Thus such displays are limited in viewing angle, and care must be taken to place the viewers within the limited viewing space.

Another drawback of large format matrix video displays is the sheer complexity of the matrix itself. Assembling and supporting up to several hundred television tubes in a matrix is a difficult engineering task, in terms of mechanical support of the tubes in such close proximity, heat dissipation, wiring routing, and maintenance and replacement of individual tubes. These problems have not been addressed in the prior art, resulting in high cost and extensive labor required to build and sustain a large format matrix display.

SUMMARY OF THE PRESENT INVENTION

The present invention generally comprises a large format matrix video display that greatly simplifies the construction and maintenance of the video display. More importantly, the construction of the present invention prevents image spillover between adjacent units inn the display matrix, and eliminates the dark matrix border lines that degrade the images provided by prior art video displays.

The present invention includes a plurality of video projection units joined together in a matrix to form a large video wall display. Each unit comprises a trio of CRT projection tubes providing aligned RGB images directed to a display screen assembly. The screen assembly includes a fresnel lens which receives the image from the RGB tubes and collimates and projects the combined image orthogonally from the screen and eliminates the dark border areas between adjacent projection units. Disposed between the adjacent units are blinder panels which block leakage of light from one unit onto the image area of adjacent units, thus eliminating spillover of image portions in the matrix display. The projection units may be grouped in modules of four units each, connected by a common frame assembly which supports the units and the associated screen assembly. The screen assembly may comprise a module screen frame securing a lamination of an inner transparent plastic panel extending across the entire module screen area, with the individual fresnel lenses joined to the inner plastic panel and a plurality of lenticular lenses secured to the outer surface of the screen assembly to increase the viewing angle in both horizontal and vertical axes. Support wires may extend between medial points of the sides of the screen frame, the wires being received in grooves in the edges of the lenticular lenses to support the central portion of the screen assembly without any visible structure.

BRIEF DESCRIPTION OF THE DRAWING

FIG. 1 is a schematic representation of the large format video matrix display of the present invention, together with associated drive and control devices.

FIG. 2 is a partially cutaway front elevation of the large format video matrix display of the present invention.

FIG. 3 is a side cross-sectional elevation of the present invention, taken along line 3—3 of FIG. 2.

FIG. 4 is an enlarged top view of a portion of the screen assembly and blinder panel assembly of the present invention.

FIG. 5 is an enlarged, exploded, perspective view of the screen assembly of the present invention.

FIG. 6 is a front elevation of a module of projection units constructed in accordance with the present invention.

FIG. 7 is a cross-sectional elevation of a module of the present invention, taken along line 7—7 of FIG. 6.

FIG. 8 is an enlarged cross-sectional view of the screen frame adjustment mechanism of the present invention, taken along line 8—8 of FIG. 6.

FIG. 9 is a schematic top view of a further embodiment of the present invention, in which a plurality of CRT projection units are directed at the same screen portion for increased brightness.

FIG. 10 is a schematic front view of the embodiment depicted in FIG. 9.

FIG. 11 is a cross-sectional top view of a screen assembly fabricated in accordance with the present invention.

FIG. 12 is an exploded view of a further embodiment of the screen assembly of the present invention.

DESCRIPTION OF THE PREFERRED EMBODIMENT

The present invention generally comprises a large format matrix video display construction. With reference to FIG. 1, the invention includes a video display matrix 21 composed of a plurality of image forming units 22 in closely spaced relationship in a rectangular array. A video source line, leading to any source such as a video cassette recorder or laser disc player, a video broadcast source or satellite receiver, video camera output, or computer video output, is connected to a device 23 that converts the composite video signal to separate red, green and blue (RGB) signals. These signals are fed into a video display driver 24 that divides the video signals and apportions them among the image forming units 22, so that, e.g., a single unified image may be displayed by the entire matrix, or portions of the matrix may display separate images, or the like. A typical display driver 24 known in the prior art is available from Delcom USA, Inc, Philadelphia, Pa. The driver 24 is connected to a computer 26 that controls the presentation of the images on the matrix, as in known in the prior art, under software control.

With regard to FIGS. 2 and 3, each image forming unit 22 includes a trio of high intensity output cathode ray tubes 27,28, and 29, each receiving one of the RGB signals from the video controller and generating a corresponding primary color image. The CRTs 27–29 are supported in a structural framework 31 of tubular metal or the like, and directed toward a mirror or prism 32. The mirror 32 reflects the images toward a respective display screen 33. It may be appreciated that the CRTs 27–29 of each unit 22 are filtered, focused, and aimed so that their images converge to the greatest extent possible on the screen 33 to produce a sharp, full color image.

The mirror 32 of each image forming unit 22 permits the optical path to be folded, resulting in a greatly reduced depth dimension of the unit 22 and a more compact construction. In situations in which this factor is not important, the CRTs 27–29 may be oriented horizontally and aimed directly at the display screen 33.

A salient feature of the present invention is that the imaging units 22 are constructed in modules to simplify construction and maintenance. Each structural framework 31 supports four imaging units 22 in a two by two modular matrix 35, as shown in FIGS. 2 and 3. Each module 35 is joined by bolts 34 to laterally and vertically adjacent modules. It should be noted that this construction permits the assembly of video displays of various heights and widths without increasing the complexity of the structure. The structural framework 31 comprises a rectangular frame of sufficient height and width to support the four imaging units 22 and the screens associated therewith, and includes conventional cross-braces, vertical and lateral tubes, and the like. The depth of the rectangular frame is relatively small, due to the fact that the CRT tubes are oriented with their long axes disposed vertically and the mirrors 32 direct the images to the screens.

Another important feature of the present invention is the construction of the screen assembly 33 and the benefits it provides. A plurality of rigid tubular members 36 extend laterally from the each of the frameworks 31 (FIGS. 3 and 4) and support a respective rectangular screen frame 37 (FIG. 6). The screen frames 37 each support four screen assemblies 33, one for each of the four imaging units 22 in the module. With regard to FIG. 7, the screen frame 37 comprises a channel member formed as a rectangle with the channel cavity opening inwardly toward the screen components. The screen components include an inner panel 38 of high transparency plastic which extends the entire height and width of the screen frame 37 and supports the four screen units of the module. The panel 38 may be formed of acrylic plastic or the like, and is of sufficient thickness (on the order of 0.5 inch) to provide substantial stiffness and support. Impinging on the outer surface of the panel 38 are four fresnel lenses 39, each associated with one of the imaging units 22. The fresnel lenses 39 each provide slight magnification to the image passing therethrough, to eliminate the dark border field known in many prior art video matrix assemblies. Secured to the outer surface of the fresnel lenses 39 are four lenticular lenses 41, each associated with one of the imaging units 22 and generally coextensive with the respective fresnel lens 39. The lenticular lens directs the image light toward the intended viewing area, and defines the viewing angle of the system. In this embodiment the lenses 41 are provided with vertically extending lens elements, so that the image viewing angle is expanded in the horizontal direction. Due to the fact that most viewers of large format video matrices are disposed within a narrow range of vertical angles and a wide range of horizontal angles with respect to the central axis of the display matrix, the lenses 41 provide the necessary increase in the horizontal viewing angle to accommodate all viewers.

The screen components 38, 39, and 41 (FIG. 5) are laminated together with a transparent adhesive, and are secured compressively at their outer edges within the channel cavity of the screen frame 37. To further support the outer lenticular lenses 41, a groove 42 is molded or routed in all the edge portions of the lenses 41 which confront adjacent lenses 41 (FIG. 7). The grooves 42 are semicylinders, and two confronting grooves 42 define a closed channel that is adapted to receive a support wire 43. Indeed, a pair of support wires 43 extend between and bisect the sides of the screen frame 37. As shown in FIG. 8, the wires 43 extend through the web of the channel member that forms the frame 37, the ends of the wires 43 being joined to a turnbuckle assembly 44 rigidly secured to the midpoint of the sides and top and bottom of the frame 37. The turnbuckle assemblies 44 exert high tension on the wires 43 to hold the wires rigidly in place. It may be appreciated that the wires 43 aid in reinforcing the central portion of the screen assembly of the module, and particularly augment the strength of the screen assembly with regard to wind load or air pressure changes that can exert large forces on the screen assembly.

A further feature of the modular assembly of the present invention, shown in FIG. 4, includes a plurality of blinder panels 46 secured to the tubular support members 36. The blinder panels 46 are aligned with and generally coextensive with the seams extending between the the fresnel lenses 39 and lenticular lenses 41 of adjacent imaging units 22. The blinder panels are thin panels of metal, plastic or the like that are opaque, and are disposed to block all light spillover between the images of adjacent units 22. It may be appreciated that the collimating effect of the fresnel lenses 39 masks the presence of the blinder panels, as well as the wires 43 extending between the lenticular lenses. The lenticular lenses also mask the presence of the screen frame thickness between adjacent modules. The result is a continuous image across the entire module, and across the entire screen composed of many adjacent modules, with no dividing lines to disrupt the image and distract the viewer.

In describing further embodiments of the present invention below, reference numerals used before refer to the same components described above.

A further embodiment of the present invention, shown in FIGS. 9 and 10, includes a plurality of each of the CRT projection units 27,28, and 29, focused, aligned, and directed at the same screen portion 33. In this construction all the tubes may be used at full output to greatly increases the brightness of the image. This is especially useful for video displays located in high ambient light locations, such as outdoor sports arenas and the like. Alternatively, this embodiment can be used to increase the longevity of the video display by permitting a reduction in the output of each CRT while maintaining the same brightness as a single unit system operating at full output.

A further embodiment of the invention, depicted in FIG. 11, comprises another screen assembly for each module 35 of the video display matrix. In this embodiment the screen frame 37 is provided as before, with an inner panel 38 of transparent plastic material extending the full width and height of the screen frame. A plurality of individual fresnel lenses 39 are also provided as before, one for each image projection unit 22. However, in the present embodiment the individual lenticular lenses 41 and the wire support 43–44 is eliminated, and a single lenticular lens 51 is secured to the outer surfaces of the fresnel lenses 41. The lenticular lens 51 extends the entire width and height of the screen frame 37, and the edges of the lens 51 are secured in the channel cavity of the screen frame. As before, the lens elements of the lens panel 51 are oriented vertically to expand the horizontal viewing angle. Although lenticular lens panels of this size (the four fresnel lenses shown in FIG. 11 indicate a four by four module having sixteen imaging units) are more expensive to manufacture, the price of such items is declining and the availability is increasing, so that this simplified construction is rapidly becoming practical.

The screen assembly depicted in FIG. 11 may be further modified, as shown in FIG. 12, to alter and expand the viewing angle of the video display. In addition to the screen frame 37, transparent panel 38, fresnel lenses 39, and large lenticular lens 51 in the laminated screen assembly, a second lenticular lens 52 is laminated to the outer surface of the lenticular lens 51. The lens panel 52 is formed with lens element extending horizontally, so that the vertical viewing angle is expanded as well as the horizontal viewing angle. This feature is important in situations in which the viewers are disposed throughout a large vertical range with respect to the video display, such as large a large stadium or theater with many tiers of seats, or the like.

It should be noted that the various embodiments described herein may be combined in various ways without departing from the concept or scope of the present invention. For example, the multiple projection unit arrangement of FIGS. 9 and 10 may be used in conjunction with the screen assembly of FIG. 12, so that the brightness of the overall video image is not diminished by the increased vertical viewing angle. Likewise, the modules 35 of the invention may be of any convenient size, and are not limited to the two by two or four by four format shown in the drawings. Furthermore, the single lenticular screen 51 or the double lenticular screens 51 and 52 are not limited to use with two by two or four by four modules, respectively, as shown in the drawings, but may be used with any desired module size.

The large format video display apparatus described herein provides many unique characteristics, among them:

(1) unlimited video display size and unlimited expandability without loss of image brightness;

(2) elimination of dark field borders between projection units;

(3) combination of multiple projection units to increase image brightness;

(4) minimization of effects of ambient light due to use of fresnel lenses;

(5) blinder panels that block image spillover (overscan);

(6) shallow depth construction due to vertical orientation of CRT tubes;

(7) selection of viewing angle range to suit location of video display.

I claim:

1. A multiple screen, modular video display system, including a plurality of video projection units joined together in a matrix to form a large video wall display, each of said projection units including a projection screen and a CRT image generating unit disposed to direct an image on said projection screen; said video projection units being grouped as subsets in a plurality of separable modules adapted to be joined in impinging, adjacent relationship, each of said modules including a structural framework for supporting said subset of said projection units and said projection screen associated therewith, said each module including a rectangular screen frame joined thereto and having a screen area equal to the sum of the areas of the projection screens of all said projection units in said each module, a transparent panel extending the height and width of said screen frame, a plurality of fresnel magnifying lenses secured to said transparent panel in edge adjacent fashion, said fresnel lenses each incorporating the area of one of said projection screens in said each module and being coextensive therewith, said fresnel lenses being disposed to mask the dark field border areas of said each projection unit.

2. The multiple screen, modular video display system of claim 1, wherein said each module further includes at least one lenticular lens panel secured to said fresnel lenses and disposed coextensive therewith, said lenticular lens panel including lens elements adapted to increase the horizontal viewing angle of said video wall display.

3. The multiple screen, modular video display system of claim 2, wherein each module further includes a plurality of opaque blinder panels disposed between adjacent projection units and coextensive and parallel to the confronting edges of adjacent projection screens in said module, said blinder panels blocking image spillover between said adjacent projection units.

4. The multiple screen, modular video display system of claim 2, wherein said screen frame includes a pair of support wires extending in taut fashion between medial portions of the sides of said screen frame, and the top and bottom of said screen frame, said lenticular lens panel including a plurality of lenticular lenses disposed in edge adjacent fashion, each coextensive with one of said fresnel lenses, said lenticular lenses including grooves formed in confronting edges thereof and dimensioned to receive said support wires to reinforce the assembly of said lenticular lenses, said fresnel lenses, and said transparent panel in said each module.

5. The multiple screen, modular video display system of claim 4, further including means for adjusting the tension of said support wires.

6. The multiple screen, modular video display system of claim 2, wherein said at least one lenticular lens panel comprises a single lenticular lens panel extending the full width and height of said screen frame.

7. The multiple screen, modular video display system of claim 6, further including a second lenticular lens panel extending the full width and height of said screen frame and joined to said single lenticular lens panel, said second lenticular lens panel having lens elements disposed to increase the vertical viewing angle of said video display.

8. The multiple screen, modular video display system of claim 2, wherein said fresnel lenses, said lenticular lens panel, and said transparent panel are laminated together with transparent adhesive.

9. The multiple screen, modular video display system of claim 8, wherein said screen frame includes a channel member having a channel cavity opening toward said projection screen, said channel cavity engaging continuous edge portions of said laminated lens and panel assembly.

10. The multiple screen, modular video display system of claim 1, wherein said CRT image generating unit includes red, green, and blue CRT image generating tubes each having an image projection axis oriented extending parallel to said projection screen, and a reflective surface associated with each projection unit and oriented to reflect the images from said tubes to said projection screen.

11. A multiple screen, modular video display system, including a plurality of video projection units joined together in a matrix to form a large video wall display, each of said projection units including a projection screen and a CRT image generating unit disposed to direct an image on said projection screen; said video projection units being grouped as subsets in a plurality of separable modules adapted to be joined in impinging, adjacent relationship, each of said modules including a structural framework for supporting said subset of said projection units and said projection screen associated therewith, wherein said each projection unit includes a plurality of CRT image generating units disposed to generate a plurality of images, and means for directing said plurality of images therefrom to a common projection screen to increase image brightness.

* * * * *